Patented Dec. 25, 1951

2,579,873

UNITED STATES PATENT OFFICE 2,579,873

CELLULOSE DERIVATIVES

George W. Seymour, Maplewood, Blanche B. White, Summit, and Howard R. Kirshen, Chatham, N. J., assignors to Celanese Corporation of America, a corporation of Delaware No Drawing. Application December 22, 1948, Serial No. 66,824

14 Claims. (Cl. 260—213)

This invention relates to cellulose derivatives, and relates more particularly to cellulose derivatives containing a morpholine group as a substituent and to a process for preparing the same.

An important object of this invention is to provide a cellulose derivative containing a morpholine group as a substituent which has an affinity for and may be dyed with acid dyes.

Another object of this invention is to provide an organic acid ester of cellulose containing a morpholine group as a substituent which has an affinity for and may be dyed with acid dyes.

A still further object of this invention is the provision of a process for preparing cellulose derivatives containing a morpholine group as a substituent.

Other objects of this invention will be apparent from the following detailed description and claims.

We have now discovered that cellulose derivatives containing a morpholine group as a substituent have high affinities for and may be dyed readily with acid dyes. In addition, when cellulose derivatives containing a morpholine group as a substituent are dyed with dyes having an affinity for organic acid esters of cellulose such as cellulose acetate, the dyed materials exhibit an improved resistance to acid fading as compared with the unsubstituted materials.

The morpholine group may be substituted directly on the cellulose molecule or may be substituted on another group which is linked to the cellulose molecule. The morpholine group may be unsubstituted or may be substituted with various other groups including, for example, alkyl, aryl or heterocyclic groups such as methyl, ethyl, propyl, phenyl and furyl groups which may be substituted further if desired. Any number of morpholine groups may be introduced into the cellulose molecule, but it is preferred to substitute a sufficient number of said groups to give the cellulose derivative a nitrogen content of between about 0.5 and 4.0%.

We have found that the best results are obtained when the morpholine group is substituted directly on the cellulose molecule of an incompletely esterified organic acid ester of cellulose such as, for example, cellulose acetate, cellulose propionate, cellulose acetate propionate, cellulose acetate butyrate, cellulose benzoate or cellulose glycollate. However, the morpholine group is also useful when substituted on the cellulose molecule of an incompletely etherified cellulose ether such as, for example, ethyl cellulose, benzyl cellulose, cellulose glycol, or on a mixed ether ester. Instead of substituting the morpholine group directly on the cellulose molecule it may be substituted on the ester or ether forming group. We have also found that the morpholine group may be substituted directly on the cellulose molecule of otherwise unsubstituted cellulose.

To prepare the cellulose derivative containing a morpholine group as a substituent, a hydroxyl group on the cellulose molecule or on a substituent on said molecule may be reacted with an organic sulfonyl chloride such as an alkyl or an aryl sulfonyl chloride to produce the organic sulfonyloxy derivative of cellulose. Among the organic sulfonyl chlorides which may be employed for this purpose are tosyl chloride (p-toluenesulfonyl chloride) or mesyl chloride (methane sulfonyl chloride) which will yield the tosyloxy or the mesyloxy derivatives of cellulose, respectively. Thereafter, the organic sulfonyloxy derivative of cellulose may be reacted with morpholine, and the morpholine will replace the organic sulfonyloxy group almost quantitatively. This reaction may be carried out simply by dissolving the organic sulfonyloxy derivative in morpholine and heating the solution to between about 50 and 100° C. for a period of between about 1 and 3 hours.

The reactions which are believed to occur during this process are:

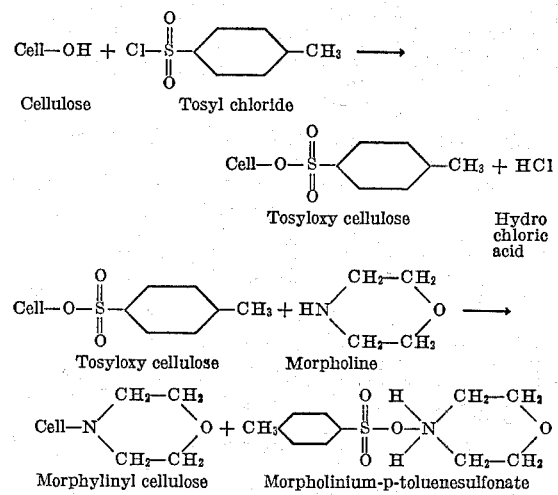

wherein Cell represents a cellulose molecule which may, if desired, be substituted by ester or ether forming groups and OH represents a free hydroxyl group on the cellulose molecule or on the ester or ether forming groups.

The cellulose derivatives containing a morpholine group may be employed, for example, for the production of textile materials. They may also be employed for the production of films, foils or molded articles or for any other related purpose. The cellulose derivatives may be compounded with fillers, plasticizers, fire-retardants and ultra-violet absorbing materials; and may be dyed or contain pigments, nacreous materials or similar substances to provide a decorative effect.

The cellulose derivatives prepared in accordance with this invention possess a high affinity for and may be dyed with various acid dyes such as, for example, Acid Violet 4BNS (C. I. 698), Wool Fast Blue GL (C. I. 833), Xylene Milling Yellow S(C. I. 145) or Alizarine Rubinol R (C. I. 1091). Moreover, when they are dyed with dyes having an affinity for organic acid esters of cellulose such as, for example, 1,4-dimethylamino-anthraquinone, 4 - chlor. - 2 - nitro - 4' - methoxy-diphenylamine or p-nitro-benzene-azo-dioxyethyl-m-toluidine, they show an improved resistance to gas fading as compared with the unsubstituted materials.

The following examples are given to illustrate this invention further.

*Example I*

To a solution of 40 parts by weight of cellulose acetate having an acetyl content of about 53%, calculated as acetic acid in 226 parts by weight of pyridine, there is added 45 parts by weight of tosyl chloride in 98 parts by weight of pyridine, both solutions having been cooled previously to 20° C.

After stirring, the mixture is kept at 20° C. for 1 hour with occasional shaking and is then cooled to 0° C. Thereafter 198 parts by weight of ice cold acetone is added to the mixture and, after 5 minutes, the tosyloxy cellulose acetate is precipitated by the addition of 1500 parts by weight of water.

A solution is prepared containing 15 parts by weight of the tosyloxy cellulose acetate dissolved in 147 parts by weight of morpholine, and said solution is heated for 1.5 hours at 70° C. The tosyloxy group is replaced almost quantitatively by morpholine yielding a morphylinyl cellulose acetate having a nitrogen content of about 0.7%. The morphylinyl cellulose acetate is precipitated by the addition of water, washed and dried. It is then dissolved in acetone and spun into yarn.

*Example II*

The yarn produced in Example I is converted into a fabric and dyed in a dyebath of thirty times its weight containing 1% of 1-4-dimethyl-amino-anthraquinone and maintained at a temperature of 80° C. The dyed fabric exhibits a deep blue shade. After being dyed, the fabric is rinsed, scoured in a soap solution, rinsed again and dried in the customary manner. The dyed fabric exhibits an improved resistance to gas fading as compared with fabrics produced from cellulose acetate yarn which does not contain a morpholine group.

*Example III*

The yarn produced in Example I is converted into a fabric and immersed in a dyebath containing 3% of Fast Blue GL (C. I. 833). After being dyed, the fabric is rinsed, scoured in a soap solution, rinsed again and dried in the customary manner. The dyed fabric exhibits a deep blue shade. Fabrics produced from cellulose acetate yarn which does not contain a morpholine group shows no affinity for and are not dyed with this dye.

It is to be understood that the foregoing detailed description is given merely by way of illustration and that many variations may be made therein without departing from the spirit of our invention.

Having described our invention, what we desire to secure by Letters Patent is:

1. Process for producing cellulose derivatives containing a morpholine group as a substituent which comprises heating an organic sulfonyloxy ester of cellulose with morpholine until the sulfonyloxy group is replaced by morpholine.

2. Process for producing cellulose derivatives containing a morpholine group as a substituent which comprises heating an aryl sulfonyloxy ester of cellulose with morpholine until the sulfonyloxy group is replaced by morpholine.

3. Process for producing cellulose derivatives containing a morpholine group as a substituent, which comprises heating a tosyloxy ester of cellulose with morpholine until the tosyloxy group is replaced by morpholine.

4. Process for producing cellulose derivatives containing a morpholine group as a substituent, which comprises dissolving a tosyloxy ester of cellulose in morpholine and heating said solution until the tosyloxy group is replaced by morpholine.

5. Process for producing cellulose derivatives containing a morpholine group as a substituent, which comprises dissolving a tosyloxy ester of cellulose in morpholine and heating said solution to a temperature of between about 50 and 100° C. for a period of between about 1 and 3 hours until the tosyloxy group is replaced by morpholine.

6. Process for producing lower aliphatic acid esters of cellulose containing a morpholine group as a substituent, which comprises heating a tosyloxy ester of said lower aliphatic ester with morpholine until the tosyloxy group is replaced by morpholine.

7. Process of producing lower aliphatic acid esters of cellulose containing a morpholine group as a substituent, which comprises dissolving a tosyloxy ester of said lower aliphatic ester in morpholine and heating said solution until the tosyloxy group is replaced by morpholine.

8. Process for producing lower aliphatic acid esters of cellulose containing a morpholine group as a substituent, which comprises dissolving a tosyloxy ester of said lower aliphatic ester in morpholine and heating said solution to a temperature of between about 50 and 100° C. for a period of between about 1 and 3 hours until the tosyloxy group is replaced by morpholine.

9. A cellulose derivative containing a morpholine group as a substituent in the cellulose molecule, the said morpholine group being chemically linked to the cellulose molecule through its nitrogen atom.

10. A cellulose derivative containing a morpholine group as a substituent in the cellulose molecule, the said morpholine group being chemically linked to the cellulose molecule through its nitrogen atom, and having a nitrogen content of between about 0.5 and 4.0%.

11. A lower aliphatic acid ester of cellulose containing a morpholine group as a substituent in the cellulose molecule, the said morpholine group being chemically linked to the cellulose molecule through its nitrogen atom.

12. A lower aliphatic acid ester of cellulose containing a morpholine group as a substituent in the cellulose molecule, the said morpholine group being chemically linked to the cellulose molecule through its nitrogen atom, and having a nitrogen content of between about 0.5 and 4.0%.

13. Morpholinyl cellulose acetate, the morpholinyl group being chemically linked to the cellulose molecule through its nitrogen atom.

14. Morpholinyl cellulose acetate, the morpholinyl group being chemically linked to the cellulose molecule through its nitrogen atom, having a nitrogen content of between about 0.5 and 4.0%.

GEORGE W. SEYMOUR.
BLANCHE B. WHITE.
HOWARD R. KIRSHEN.

REFERENCES CITED

The following references are of record in the file of this patent:

UNITED STATES PATENTS

| Number | Name | Date |
| --- | --- | --- |
| 1,673,627 | Karrer | June 12, 1928 |
| 1,986,881 | Dreyfus | Jan. 8, 1935 |
| 2,083,122 | Olpin | June 8, 1937 |
| 2,120,267 | Schirm | June 14, 1938 |
| 2,131,120 | Schlack | Sept. 27, 1938 |
| 2,136,299 | Haskins | Nov. 8, 1938 |
| 2,148,655 | Seymour | Feb. 28, 1939 |
| 2,186,101 | Dreyfus | Jan. 9, 1940 |
| 2,241,542 | Dreyfus | May 13, 1941 |
| 2,243,630 | Houk | May 27, 1941 |
| 2,249,518 | Dickey | July 15, 1941 |
| 2,291,021 | Bock | July 28, 1942 |
| 2,292,332 | D'Alelio | Aug. 4, 1942 |

FOREIGN PATENTS

| Number | Country | Date |
| --- | --- | --- |
| 507,722 | Great Britain | June 20, 1939 |

OTHER REFERENCES

Textile Colorist for December 1931, pages 834–837, article by Mullin and McGee.